US008056458B2

(12) United States Patent
Edelman et al.

(10) Patent No.: US 8,056,458 B2
(45) Date of Patent: Nov. 15, 2011

(54) EXTRUDER CUT-OFF KNIFE ASSEMBLY HAVING REMOTE ADJUSTMENT MECHANISM

(75) Inventors: Matthew J. Edelman, Sabetha, KS (US); Brad Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 571 days.

(21) Appl. No.: 12/195,270

(22) Filed: Aug. 20, 2008

(65) Prior Publication Data

US 2010/0043616 A1 Feb. 25, 2010

(51) Int. Cl.
B26D 5/08 (2006.01)

(52) U.S. Cl. ............... 83/582; 83/42; 425/313

(58) Field of Classification Search .......... 83/403, 83/582, 584, 585, 42; 425/67, 196, 308–316
See application file for complete search history.

(56) References Cited

U.S. PATENT DOCUMENTS

| 419,364 | A | * | 1/1890 | Schoel | 83/356.3 |
|---|---|---|---|---|---|
| 2,594,894 | A | | 4/1952 | Fehrenbach | |
| 2,864,420 | A | * | 12/1958 | Schmidt | 241/282.1 |
| 2,888,318 | A | * | 5/1959 | Parker | 264/169 |
| 3,029,466 | A | | 4/1962 | Guill | |
| 3,196,487 | A | | 7/1965 | Snelling | |
| 3,266,090 | A | | 8/1966 | Gosney | |
| 3,337,913 | A | | 8/1967 | List | |
| 3,353,213 | A | | 11/1967 | Niemeyer | |
| 3,521,688 | A | * | 7/1970 | Urschel et al. | 83/165 |
| 3,564,650 | A | | 2/1971 | Irving | |
| 3,623,525 | A | * | 11/1971 | Kieves | 83/663 |
| 3,673,298 | A | | 6/1972 | Miler | |
| 3,691,900 | A | * | 9/1972 | Novak et al. | 409/233 |
| 3,762,658 | A | * | 10/1973 | Barnes | 241/82.5 |
| 3,832,114 | A | | 8/1974 | Yoshida | |
| 4,093,128 | A | * | 6/1978 | Barnes | 241/82.5 |
| 4,151,241 | A | | 4/1979 | Bradbury et al. | |
| 4,184,833 | A | | 1/1980 | Buchan et al. | |
| 4,249,879 | A | | 2/1981 | Anders et al. | |
| 4,285,652 | A | | 8/1981 | Anders | |
| 4,529,370 | A | * | 7/1985 | Holmes et al. | 425/142 |

(Continued)

FOREIGN PATENT DOCUMENTS

DE 3436394 4/1986

(Continued)

OTHER PUBLICATIONS

US Publication No. 2007-0172533; Pinchot; Jul. 26, 2007; Extruder System and Cutter Assembly.

*Primary Examiner* — Sean Michalski
(74) *Attorney, Agent, or Firm* — Hovey Williams LLP (57) ABSTRACT

A knife assembly (10) particularly adapted for coupling with an extruder barrel (26) is provided having a knife shaft (16) supporting a knife unit (14), with the knife shaft (16) axially rotatable and axially shiftable through fore and aft limits. The assembly (10) may be adjusted during operation without interrupting the axially rotation of shaft (16), using adjustment mechanism (24) located in a safely remote position from knife unit (14). The preferred assembly (10) includes axial shift limiting structure (114, 116, 124) serving to limit the extent of fore and aft axial movement of shaft (16). The mechanism (24) allows fine adjustment of the position of knife unit (14) relative to the extruder barrel (26), and also permits monitoring of the wear of knife unit (14).

11 Claims, 9 Drawing Sheets

U.S. PATENT DOCUMENTS

| | | | |
|---|---|---|---|
| 4,710,113 A * | 12/1987 | Voigt | 425/67 |
| 4,728,276 A | 3/1988 | Pauley et al. | |
| 4,771,669 A * | 9/1988 | Bianchi | 83/468.7 |
| 4,998,677 A * | 3/1991 | Gallaher | 241/95 |
| 5,059,103 A | 10/1991 | Bruckman et al. | |
| 5,146,831 A | 9/1992 | Fetter, Jr. et al. | |
| 5,190,768 A * | 3/1993 | Ishida et al. | 425/67 |
| 5,330,340 A * | 7/1994 | Suppon et al. | 425/142 |
| 5,360,585 A | 11/1994 | Ishida et al. | |
| 5,587,181 A * | 12/1996 | Owens et al. | 425/3 |
| 5,814,350 A * | 9/1998 | Rockstedt | 425/67 |
| 5,836,225 A | 11/1998 | Molnar et al. | |
| 6,148,709 A * | 11/2000 | Bucks | 83/663 |
| 6,332,765 B1 | 12/2001 | Spelleken | |
| 6,551,087 B1 * | 4/2003 | Martin | 425/67 |
| 6,604,929 B2 | 8/2003 | Hawley et al. | |
| 6,692,424 B2 * | 2/2004 | Pasman et al. | 493/324 |
| 7,007,559 B2 * | 3/2006 | Klammer et al. | 73/862.08 |
| 7,033,152 B2 * | 4/2006 | Eloo et al. | 425/67 |
| 7,284,468 B2 * | 10/2007 | Supe-Dienes et al. | 83/502 |
| 7,296,985 B2 * | 11/2007 | Koehler | 425/67 |
| 7,338,273 B2 * | 3/2008 | Konno et al. | 425/313 |
| 7,530,806 B2 * | 5/2009 | Pinchot | 425/142 |
| 7,721,637 B2 * | 5/2010 | Bucks | 83/663 |
| 7,730,817 B2 * | 6/2010 | Rieck | 83/245 |
| 7,832,313 B2 * | 11/2010 | Hermansen et al. | 83/23 |
| 7,861,630 B2 * | 1/2011 | Sorensen et al. | 83/42 |
| 2003/0024424 A1 * | 2/2003 | Pasman et al. | 101/226 |
| 2003/0185923 A1 * | 10/2003 | Martin | 425/67 |
| 2004/0081716 A1 * | 4/2004 | Eloo et al. | 425/67 |
| 2005/0077644 A1 * | 4/2005 | Bryan et al. | 264/143 |
| 2005/0238746 A1 * | 10/2005 | Crather et al. | 425/67 |
| 2006/0121139 A1 * | 6/2006 | Murb | 425/67 |
| 2006/0222467 A1 * | 10/2006 | Baugher | 408/8 |
| 2007/0003655 A1 * | 1/2007 | Brandstaetter et al. | 425/313 |
| 2007/0065530 A1 * | 3/2007 | Koehler | 425/67 |
| 2007/0101850 A1 * | 5/2007 | Friel, Sr. | 83/707 |
| 2007/0172533 A1 | 7/2007 | Pinchot | |
| 2007/0199421 A1 * | 8/2007 | Mueller | 83/469 |
| 2010/0143520 A1 * | 6/2010 | Pinchot | 425/142 |

FOREIGN PATENT DOCUMENTS

| | | |
|---|---|---|
| DE | 3437495 | 4/1986 |
| EP | 1576881 | 6/1983 |
| GB | 0016891 | 0/1911 |
| GB | 0848596 | 6/1958 |
| JP | 54072267 | 6/1979 |
| SU | 0514707 | 7/1974 |

\* cited by examiner

EXTRUDER CUT-OFF KNIFE ASSEMBLY HAVING REMOTE ADJUSTMENT MECHANISM

BACKGROUND OF THE INVENTION

1. Field of the Invention

The present invention is broadly concerned with improved knife assemblies of the kind commonly used with extruders to cut extrudate on a continuous basis. More particularly the invention is concerned with such knife assemblies and corresponding methods wherein the knife assemblies include an adjustment mechanism allowing easy and safe axial adjustment of the cutting knives relative to an extruder die.

2. Description of the Prior Art

Extruder systems for the production of comestible and other products typically include an elongated extruder barrel with an internal, axially rotatable auger serving to subject materials to be processed to high levels of shear and temperature. The barrel is equipped with an endmost extrusion die which serves to shape the materials as they are extruded. It is also common to provide a rotating knife assembly adjacent the die end of such an extruder barrel, in order to cut the extrudate to desired lengths. Such cut products then fall by gravity onto a conveyor belt or other similar equipment to transport the product away from the system.

The conventional knife assemblies in use today are deficient in several respects. First of all, it can be difficult and even hazardous to change the axial position of the rotating knives during operation. Indeed, in many cases it is necessary to stop the knife assembly and thus the entire system in order to adjust the knife position. Some on-the-go knife adjustment mechanisms have been proposed, but these are generally very complex and costly. For example, hydraulic devices have been tried, but these are not really satisfactory. Furthermore, some prior knife adjustment mechanisms were of the rotating type, i.e., the adjustment components normally rotate at knife speed.

In addition, it is sometimes difficult to properly gauge and determine the extent of knife wear during operation of conventional knife assemblies. This is important in that overworn knives become inefficient and damage to the knife assembly can occur if the blades are excessively worn.

There is accordingly the need in the art for an improved knife assembly of the type used in extruder systems and wherein the knife assembly may be adjusted during and without interfering with cutting operations, and which make use of non-rotating adjustment components which can be manually manipulated by the operator. Furthermore, there is a need for such a knife assembly which can monitor the extent of blade wear during operation.

The following references are indicative of the state of the art. U.S Pat. Nos. 2,594,894; 3,029,466; 3,196,487; 3,266,090; 3,337,913; 3,353,213; 3,564,650; 3,673,298; 4,151,241; 4,184,833; 4,249,879; 4,285,652; 4,529,370; 4,728,276; 5,059,103; 5,146,831; 5,360,585; 5,836,225; 6,332,765; 6,604,929; US Publication No. 2007/0172533; German Patents Nos. 3436394; 3437495; European Patent No. 001576881; Great Britain Patents Nos. 0016891; 0848596; Japanese Patent No. 54-072261; and Russian Patent No. 0514707.

SUMMARY OF THE INVENTION

The present invention overcomes the problems outlined above and provides an improved knife assembly equipped with an adjustment mechanism located at a remote position relative to the knives thereof, and which permit on-the-go axially adjustment of the knives, manual manipulation of a non-rotating mechanism. Broadly speaking, the invention comprises a knife assembly comprising an elongated, axially rotatable knife shaft supporting at least one knife adjacent an end thereof. A motor is operably coupled with the knife shaft for powered axial rotation thereof. The knife shaft is supported by an elongated bushing which permits such powered axial rotation while also permitting fore and aft axial movement of the knife shaft and supported knife. A bearing is secured to the end of the shaft remote from the knife, and a non-rotatable bearing support receives the bearing. An adjustment mechanism is operably coupled with the bearing support and is operable to permit axial adjustment of the knife shaft to individual positions without interrupting the axial rotation of the knife shaft.

In preferred forms, the knife assembly of the invention also has axial shifting limit structure operably associated with the knife shaft in order to limit the fore and aft axial movement of the knife shaft between fore and aft limits. The non-rotating adjustment mechanism can then be used to axially fine adjust the knife shaft to individual positions within the fore and aft limits.

The preferred adjustment mechanism includes a biasing spring operably engaging the end of the bearing support, together with a preloader engaging the end of the spring remote from the bearing support. A lock to secure the preloader at selected positions thereof whereby the preloader may be moved in order to vary the force exerted by the spring against the bearing support. In particular, the adjustment mechanism includes an elongated, threaded rod secured to the bearing support and extending through the preloader, with the lock threaded onto the threaded rod. In further preferred forms, the knife assembly includes a sensor assembly operable to determine the fore and aft position of the knife blade. A display is connected with the sensor assembly in order to display the fore and aft position of the knife shaft in small increments. In this manner, the operator can readily determine when the blades of the knife assembly require replacement owing to wear.

DETAILED DESCRIPTION OF THE PREFERRED EMBODIMENT

Figure 1:
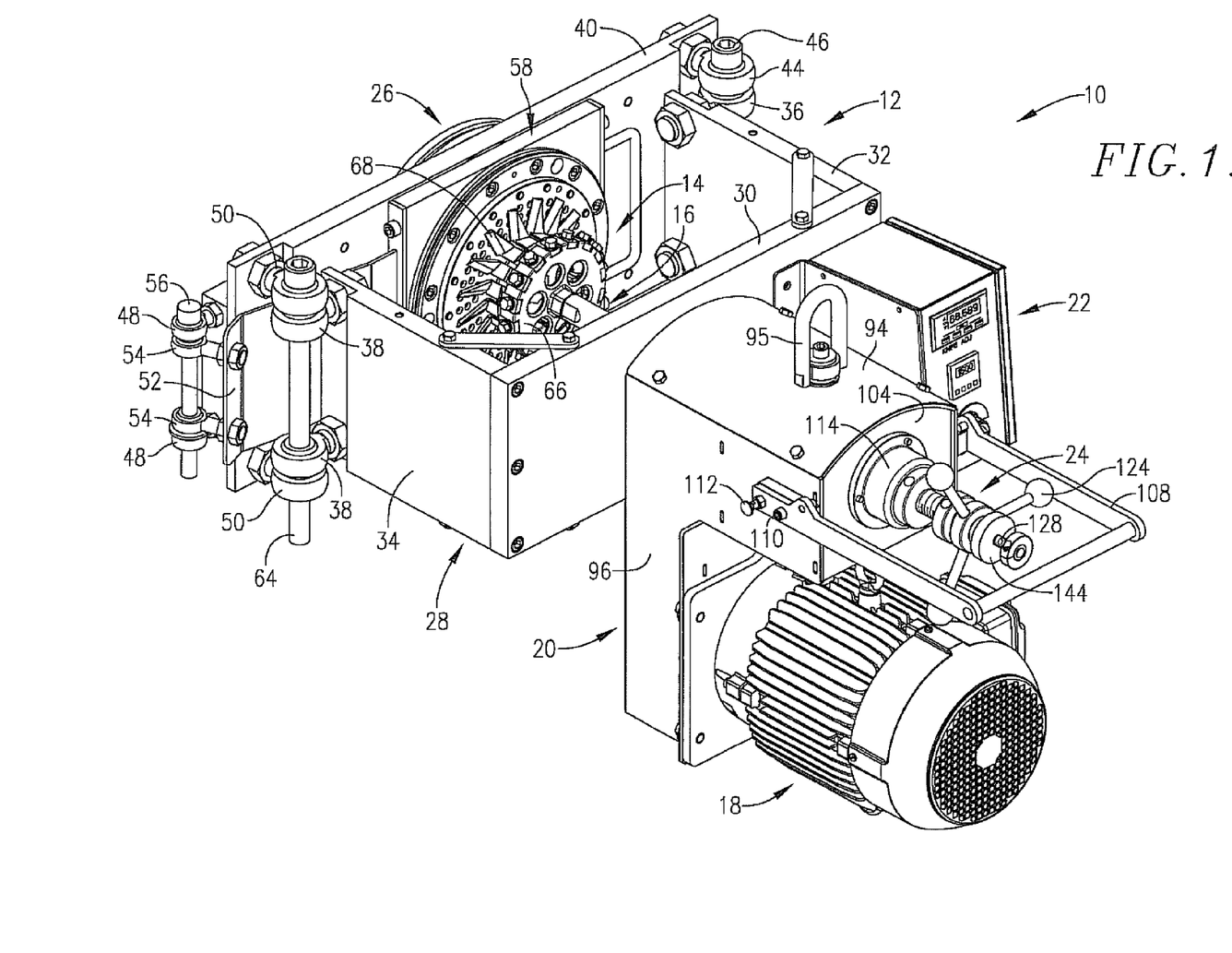
FIG. 1 is a top perspective view of a knife assembly in accordance with the invention.
Figure 2:
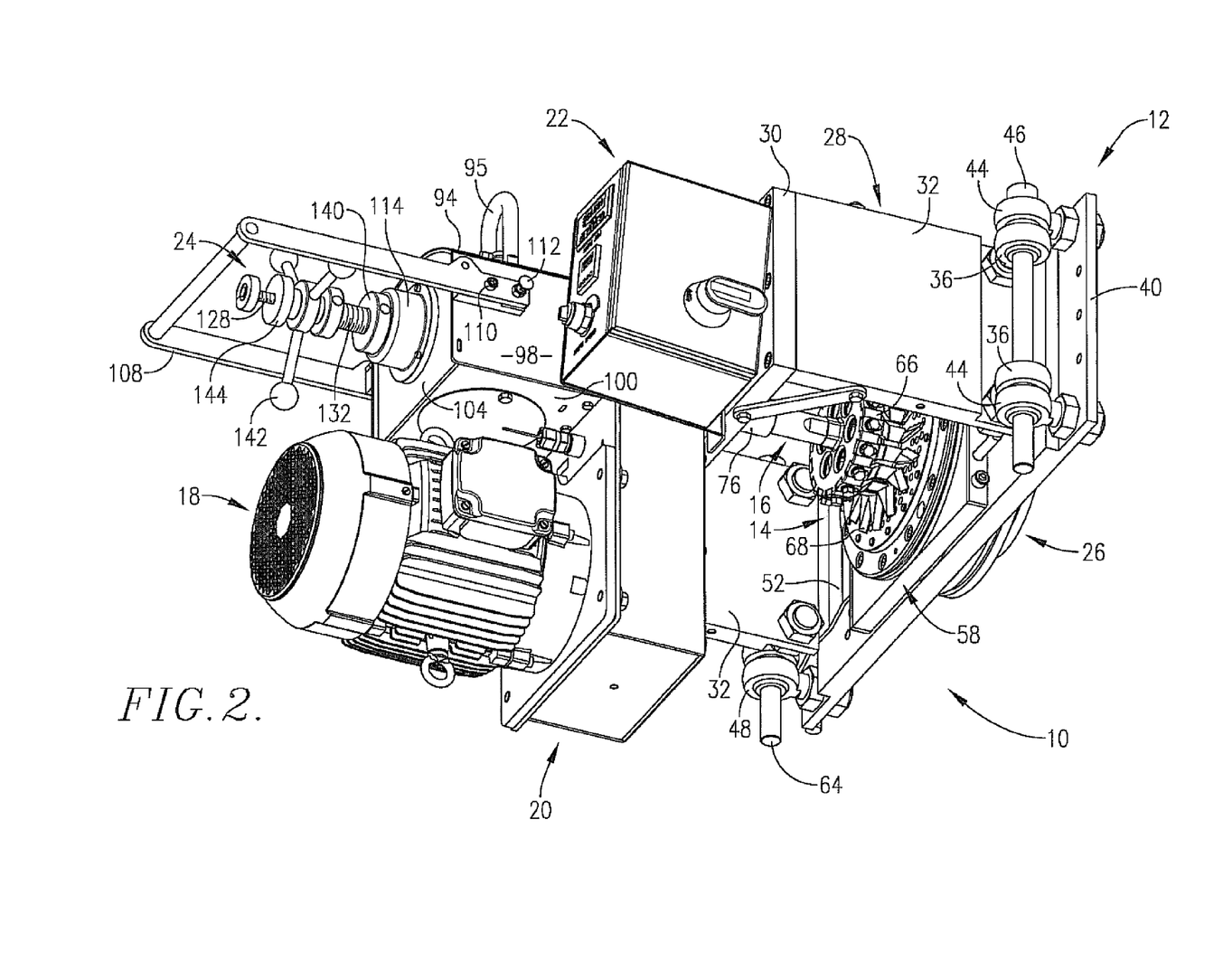
FIG. 2 is a bottom perspective view of the knife assembly.
Figure 3:
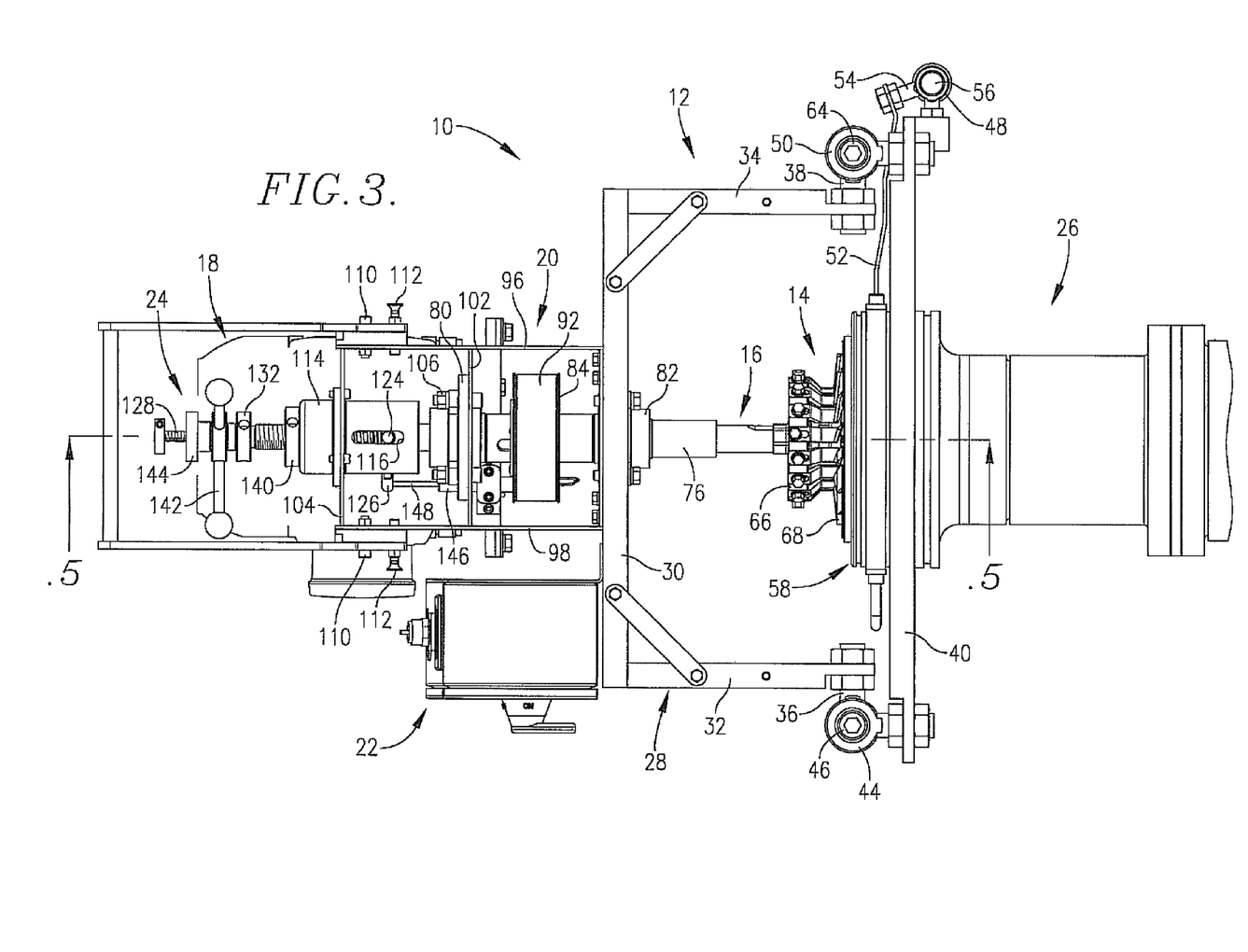
FIG. 3 is a plan view of the knife assembly.
Figure 4:
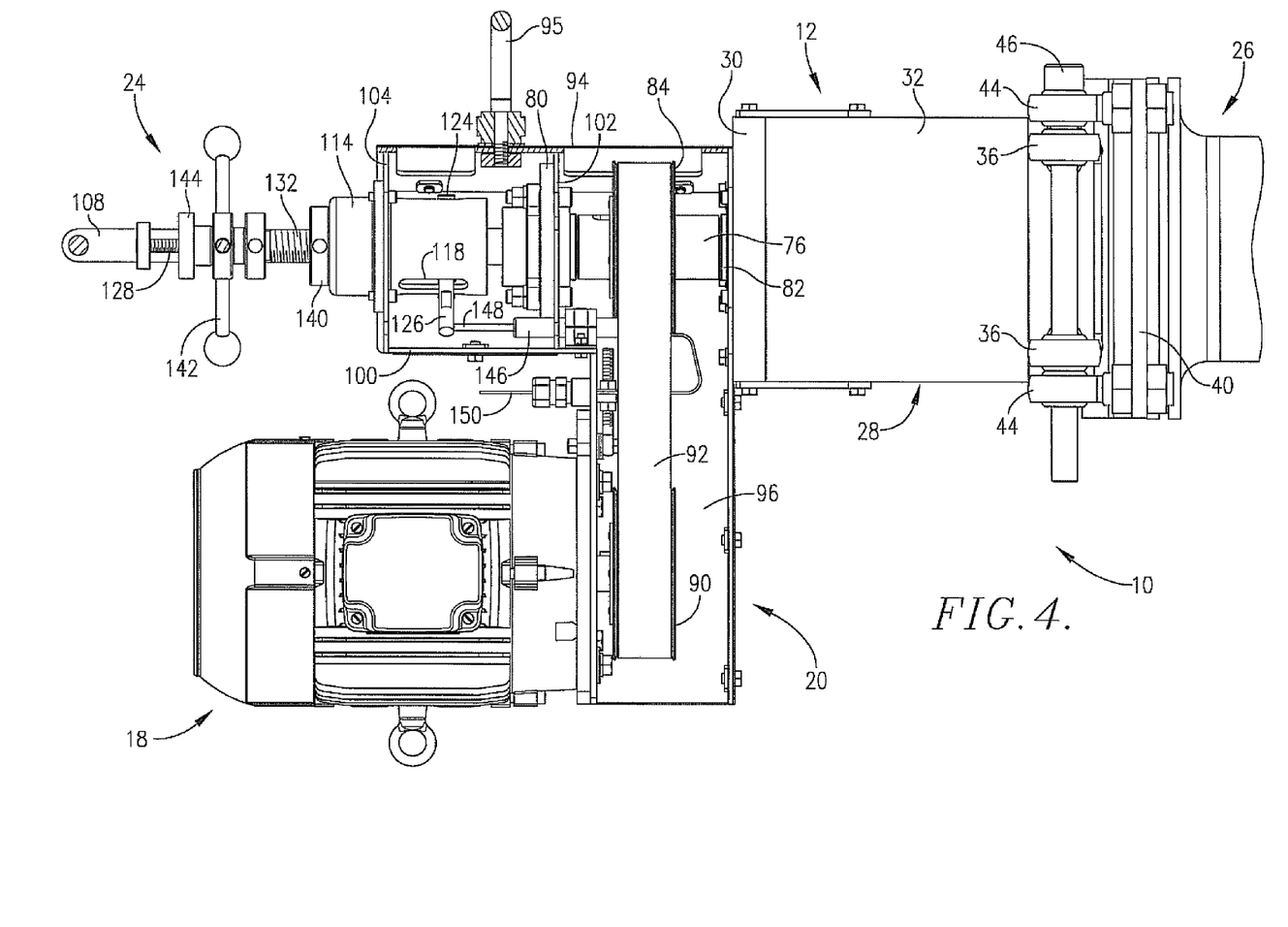
FIG. 4 is a side view of the knife assembly partially in section to illustrate internal components thereof.
Figure 5:
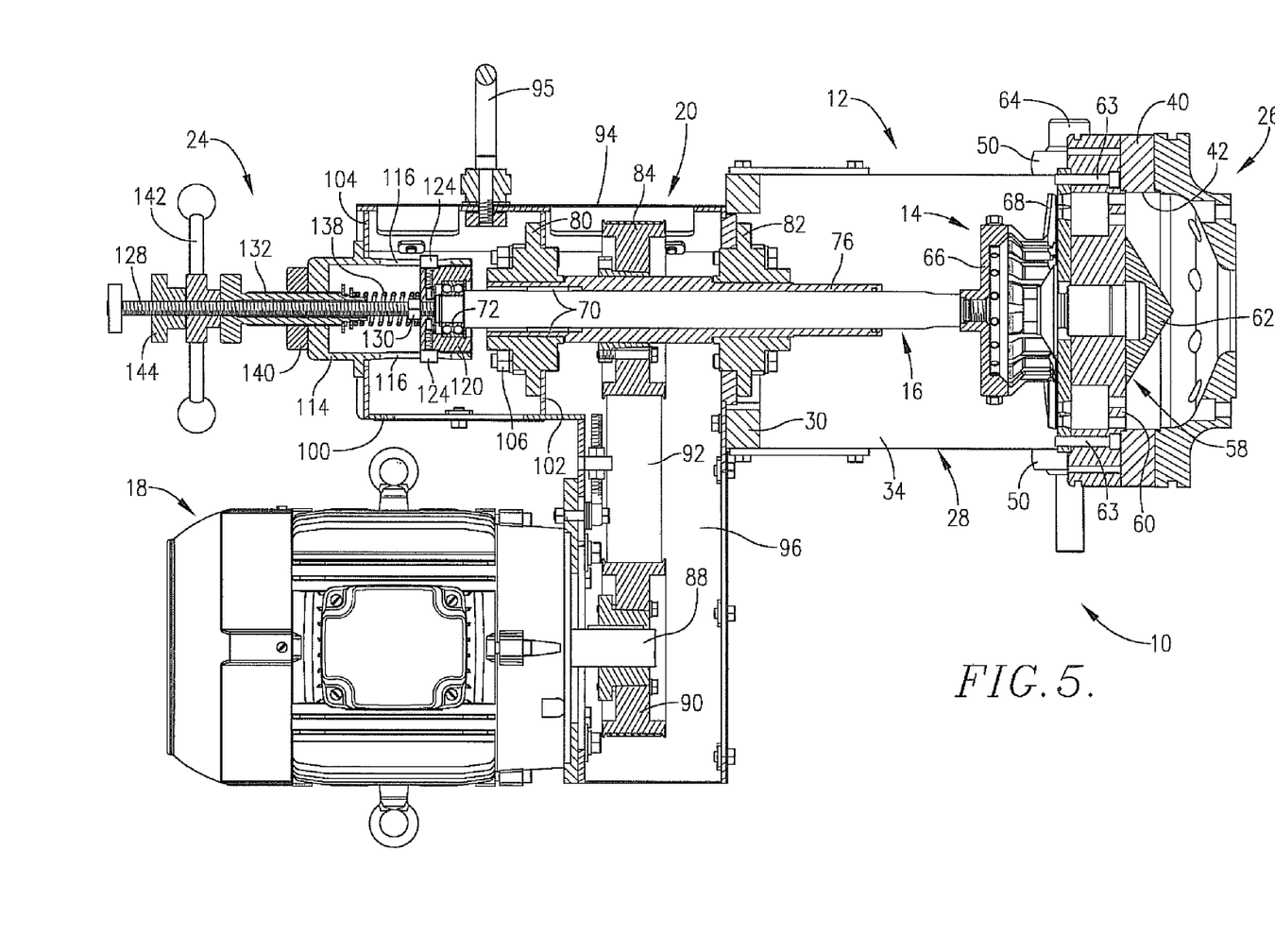
FIG. 5 is a vertical sectional view of the knife assembly.

Turning now to the drawings, a knife assembly 10 is illustrated in perspective in FIGS. 1 and 2. Broadly speaking, the assembly 10 includes a mounting and support assembly 12, a rotatable knife unit 14 mounted on elongated knife shaft 16, a motor 18, housing 20, display 22, and a knife adjustment mechanism 24 (see FIGS. 4-6 and 8). As explained below, the knife assembly 10 is typically secured to the output end of an extruder barrel 26, in order to cut extrudate emerging from the extruder In more detail, mounting and support assembly 12 has a generally U-shaped main body 28 including an apertured end plate 30 and marginal side plates 32 and 34. The side plate 32 has a pair of vertically spaced hinge pin mounts 36 whereas plate 34 includes a pair of locking eyes 38. In addition, a terminal mounting plate 40 is provided with a central opening 42. The end of plate 40 adjacent side plate 32 has a pair of hinge pin mounts 44 aligned with the hinge pin mounts 36. A removeable hinge pin 46 serves to hingedly connect terminal plate 40 with side plate 32. The opposite end of plate 40 also has a pair of hinge pin mounts 48 as well as locking eyes 50. An intermediate plate 52 is hingedly connected with terminal plate 40, by means of hinge pin mounts 54 and a removeable hinge pin 56. The plate 52 carries an extruder die assembly 58 including an apertured plate member 60 and flow-directing bullet 62; the assembly 58 is secured to plate 52 by bolts 63.

Figure 9:
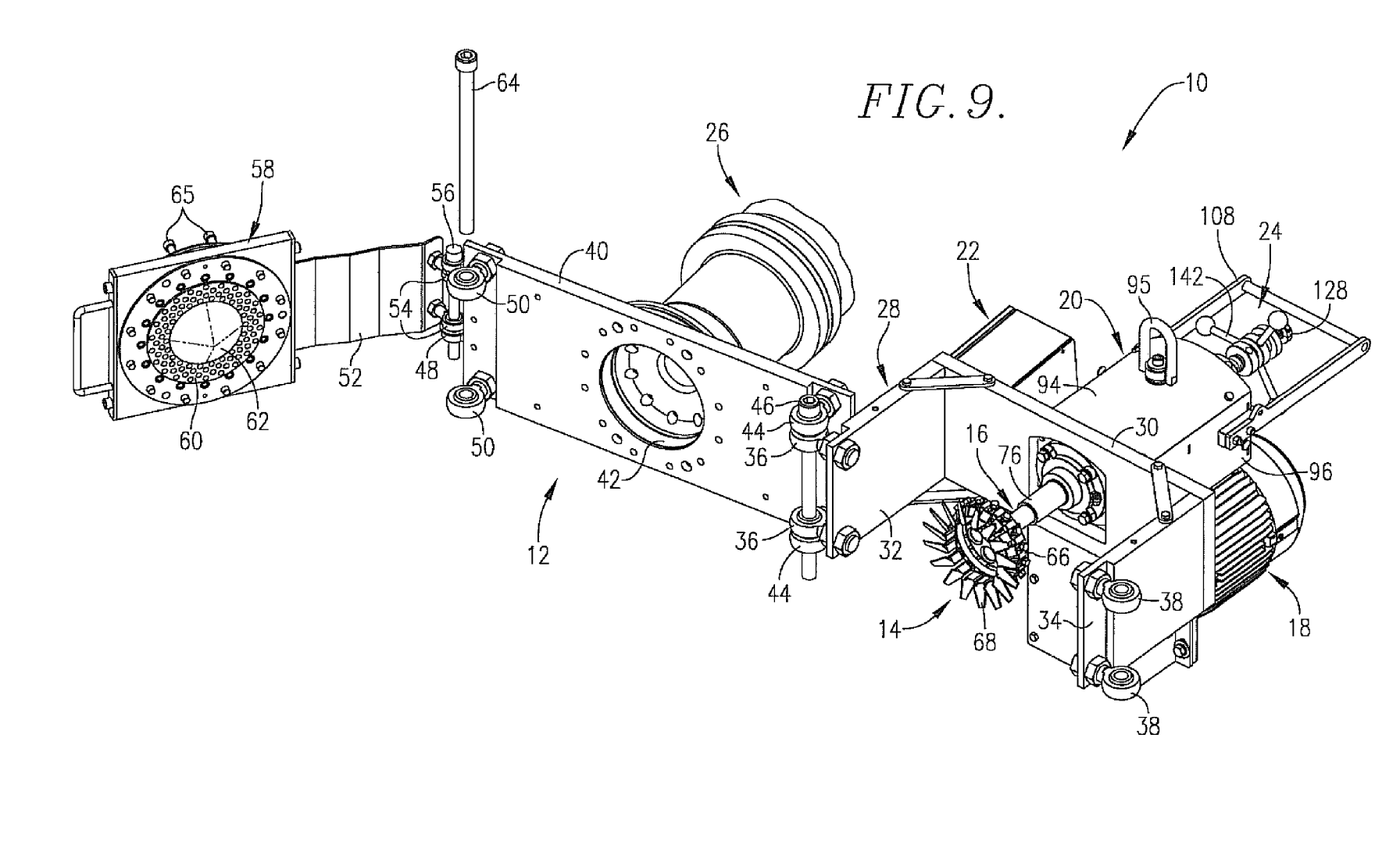
FIG. 9 is a perspective view of the knife assembly support structure and die apparatus.

As illustrated, the motor 18, housing 20, and display 22 are secured to the face of plate 30 remote from side plates 32,34. When the assembly 10 is used with the extruder barrel 26, the intermediate plate 52 is positioned so that the die assembly 58 mates with opening 42, and the die assembly 58 and plate 52 are attached to plate 40 and barrel 26 using through bolts 65 (FIG. 9). The main body 28 is positioned with the locking eyes 50 in registry with locking eyes 38. A removable connector pin 64 is used to secure the assembly 10 together.

The knife unit 14 includes a circular knife head 66 which supports a plurality of radially outwardly extending cutting knives 68. In operation, the knives 68 are in engagement with or closely proximal to the plate member 60 so as to cut extrudate passing through the plate member 60 into a desired length.

Figure 6:
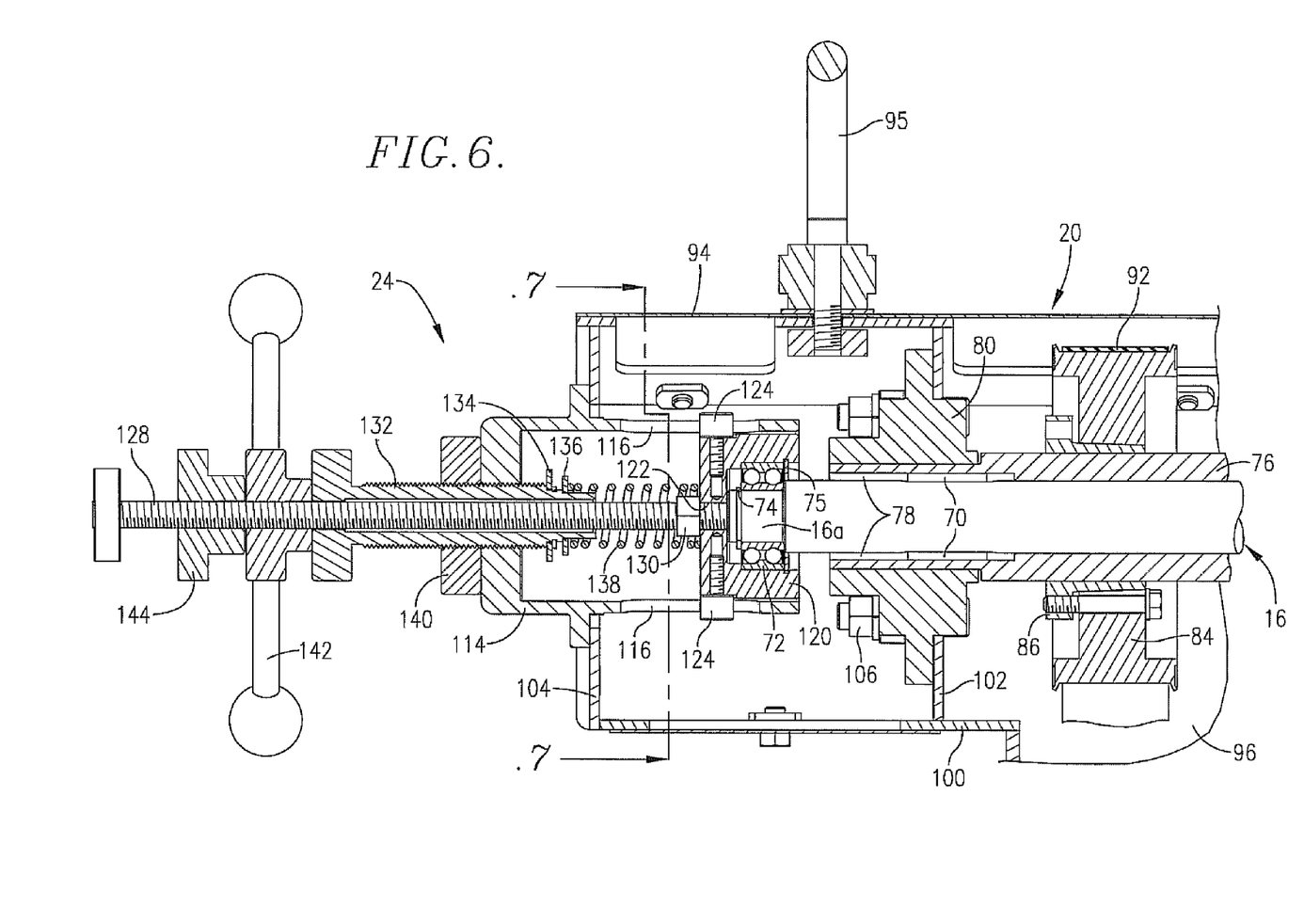
FIG. 6 is a fragmentary, enlarged sectional view depicting the components of the remote adjustment mechanism of the knife assembly.
Figure 7:
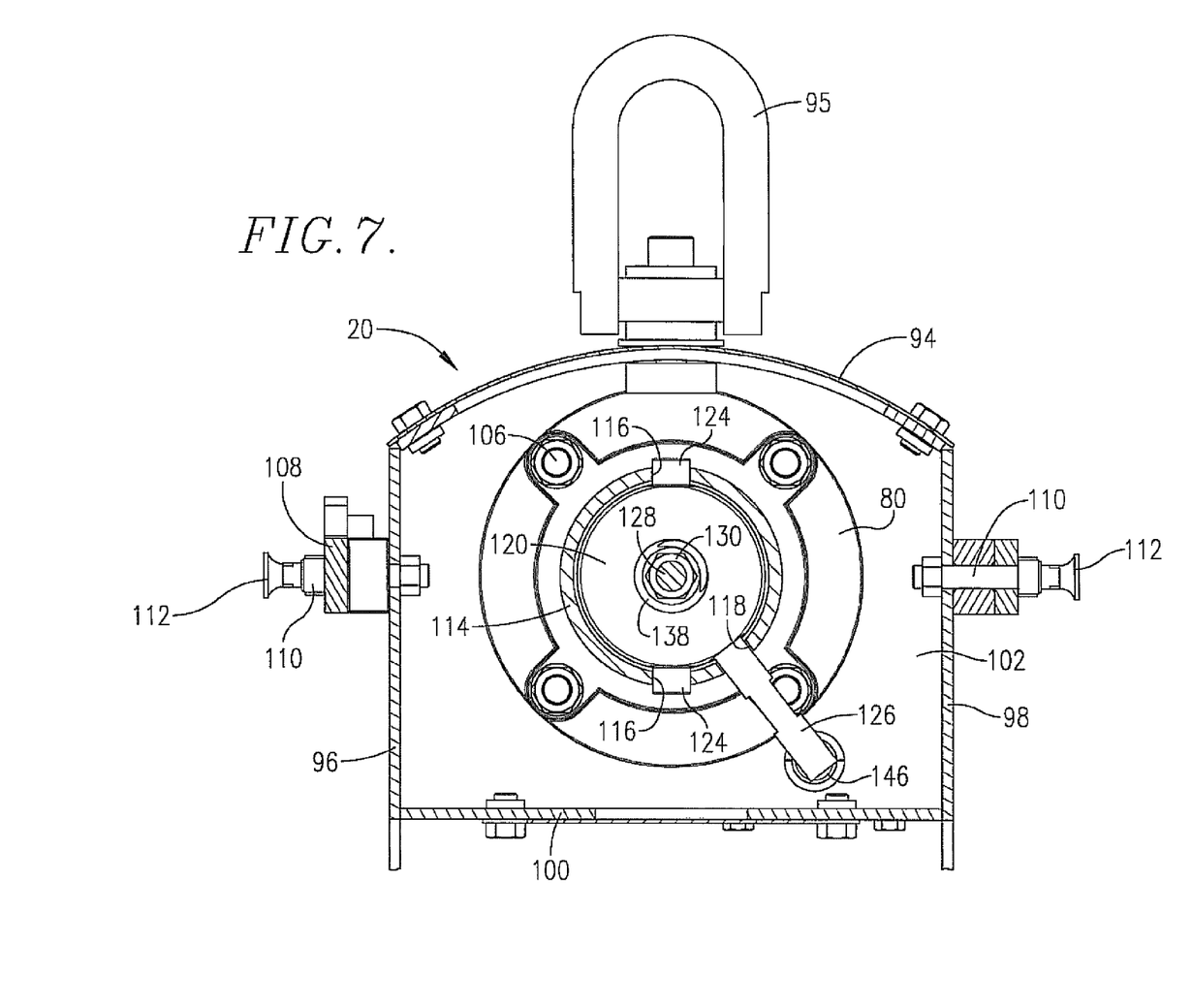
FIG. 7 is a vertical sectional view taken along line 7-7 of FIG. 6.
Figure 8:
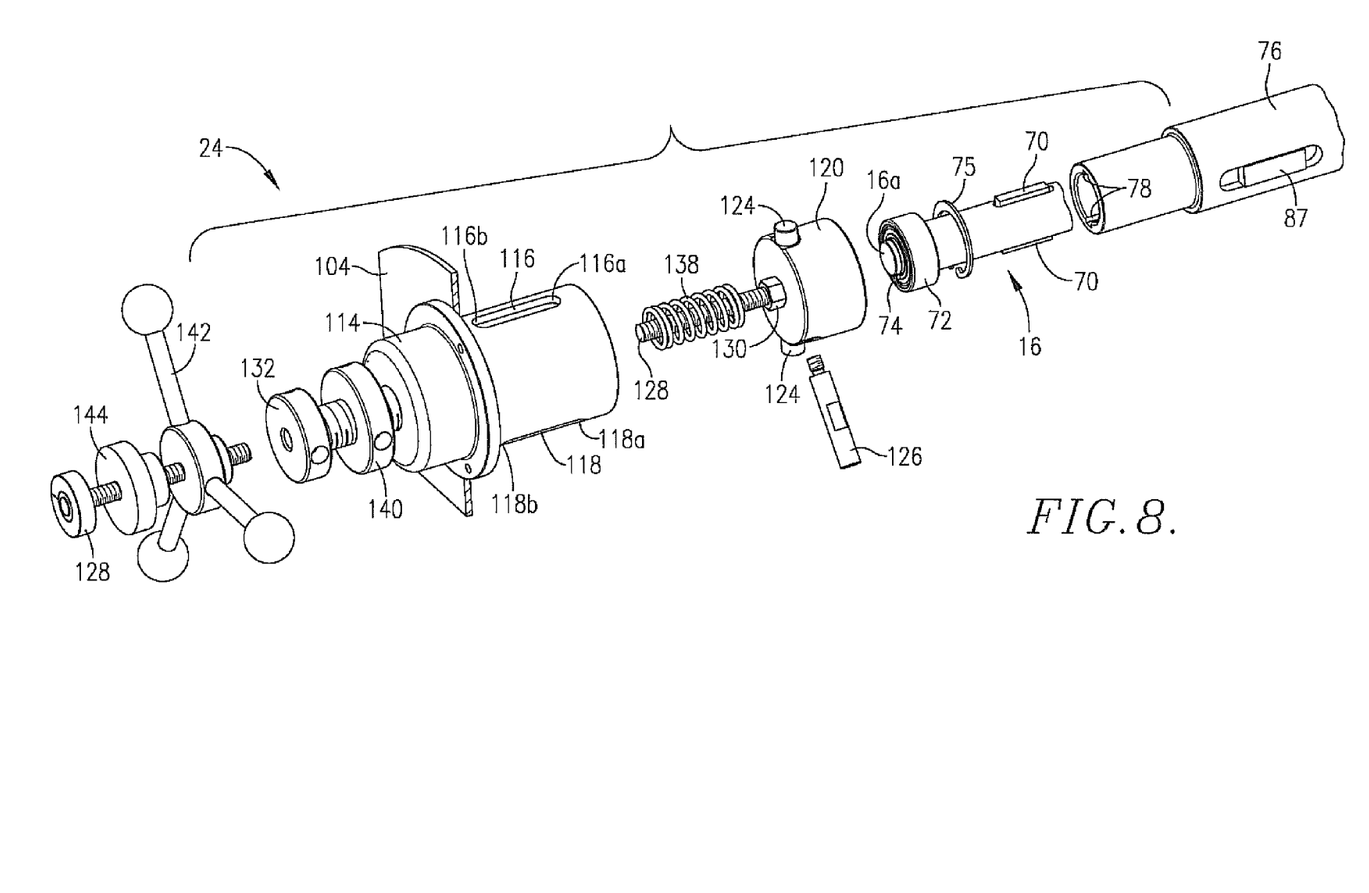
FIG. 8 is an exploded, perspective view of the components of the remote adjustment mechanism.

The outer end of shaft 16 is threadably connected to and supports the knife unit 14. Referring to FIGS. 6 and 8, it will be observed that the inner end 16a of the shaft 16 remote from unit 14 is provided with a pair of opposed keys 70. Furthermore, the end 16a has a double roller bearing 72 secured by a locking ring 74. The shaft 16 is both axially rotatable and axially shiftable. To this end, an elongated tubular bushing 76 receives shaft 16 and has a pair of opposed internal keyways 78 which slidable receive the keys 70. The bushing 76 is supported by a pair of spaced apart bushing mounts 80 and 82, with mount 80 secured to housing 20 and mount 82 secured to end plate 30. A cog wheel 84 is secured to bushing 76 by means of a hub 86 and key 87.

The motor 18 is a conventional electrical motor having an output shaft 88 with an attached cog wheel 90 below and in alignment with cog wheel 84. As illustrated, the motor 18 is bolted to housing 20. A cog belt 92 is trained about the wheels 84 and 90 in order to drivingly rotate knife shaft 16.

The housing 20 is generally L-shaped in configuration, presenting a dome top 94 equipped with a lifting eye bolt 95, a pair of depending L-shaped sidewalls 96 and 98, bottom wall 100, and intermediate and terminal apertured bulkhead walls 102, 104. As shown, the bushing mount 80 is secured to bulkhead wall 102 by connectors 106. A bail-type handle 108 is pivotally coupled to the sidewalls 96, 98 by bolts 110, and is releaseably secured in the illustrated position by spring pins 112.

The knife adjustment mechanism 24 is designed to permit gross and fine adjustment of the position of knife shaft 16 and knife unit 14 relative to die assembly 58. Furthermore, and very importantly, the mechanism 24 allows adjustment of the knife position during the operation of assembly 10 without interruption, and from a location adjacent knife shaft end 16a, so that the adjustment can be readily and safely carried out. The mechanism 24 includes a flanged cup-shaped mounting housing 114 secured to bulkhead wall 104 and having a pair of opposed cam slots 116 and a sensor arm slot 118; the slots 116, 118 have fore and aft ends 116a, 116b, and 118a, 118b, respectively. In the present embodiment, the axial travel distance between the fore and aft ends 116a, 116b is two inches. More broadly, a distance of travel of at least about ½ inch, and more preferably from 1-3 inches, is adequate. The open end of housing 114 carries a annular bearing support 120 which receives roller bearing 72 and locking ring 75. The support 120 has a threaded bore 122 and carries a pair of opposed cam follower screws 124 slideable within cam slots 116 and an oblique sensor arm 126 slideable within slot 118.

The mechanism 24 further includes a threaded collar shaft 128 which is threaded into bore 122 and secured therein by means of lock nut 130. An elongated, tubular, externally threaded preloader 132 is telescoped over shaft 128 and carries a stop washer 134 and spring washer 136. A biasing spring 138 is captively retained on shaft 128 between washer 136 and the adjacent face of bearing support 120. A locking nut 140 is threaded onto the preloader 132 and bears against the face of mounting housing 114. A handle 142 is also threaded onto shaft 128 and bears against the head of preloader 132. Finally, a cap nut 144 is threaded onto shaft 128 and bears against handle 142.

In order to sense the axial position of shaft 16 and knife unit 14, a sensor element 146 is secured to bulkhead wall 102 and has a spring-loaded plunger 148. The end of plunger 148 bears against sensor arm 126. The output from sensor element 146 is transmitted by line 150 to display 22. Accordingly, the axial position of knife shaft 16 and knife unit 14 is transmitted to and displayed by display 22.

Operation

In use, a selected die assembly 58 having appropriately sized die apertures is mounted on plate 52 when the mounting and support assembly 12 is in the swung-away position thereof as illustrated in FIG. 9. Thereupon, the plate 52 is pivoted inwardly until the assembly 58 comes into registry with the opening 42 of plate 40, and the die assembly 58 and plate 52 are secured to extruder barrel 26 by means of through bolts 65. Next, the body 28 is pivoted inwardly until locking eyes 38 mate with locking eyes 50, and connector pin 64 is used to complete the assembly. In this orientation the extruder is operated in the normal fashion so that extrudate passes from the barrel 26 and through the apertured plate member 60 of die assembly 58. The motor 18 is actuated to rotate knife shaft 16 and knife unit 14, thereby serving to cut the extrudate into a desired length.

In initial setup operations, the body 28 is swung open and collar shaft 128 and handle 142 are threaded back into abutment with cap nut 144. The knife shaft 16 is then shifted within housing 114 until cam screws 124 abut the fore ends 116a of the slots 116. Next, the preloader 132 is shifted towards handle 142 until a zero spring force is achieved, but without allowing the spring to loosen completely. In the illustrated embodiment the spring 138 has a 52 lb/inch rating. The locking nut 140 is then rotated to abut one face of preloader 132, securing it in place. The handle 142 is then rotated until it snugly abuts the other face of preloader 132. This position is then noted from the output of display 22. The display is then zeroed and the handle 142 is rotated clockwise until a reading of 0.750 inches is displayed (which is equivalent to 21 full rotations of handle 142). This serves to compress spring 138 and moves the knife shaft 16 and knife unit 14 leftwardly as viewed in FIG. 6. The cap nut 144 is then rotated against the face of handle 142. The main body 28 with the pre-adjusted mechanism 24 is then rotated into position until the locking eyes 38 register with locking eyes 50, and the pin 64 is inserted through the locking eyes. At this point, the knives 68 should be about ¼ inch away from the face of plate member 60.

The motor 18 is then actuated and runs to its normal operating speed. The handle 142 is rotated counterclockwise to allow the knives 68 move up to the surface of the plate 60. Each ⅛th revolution of the handle 142 causes about 0.004 inches of movement of the knife shaft 16 and knife unit 14. At this point the handle 142 will spin free once the knives 68 come into contact with plate 60. The spring 138 will be compressed about ½ inch and will create about 25 pounds of force between the knives 68 and the plate 60. The cap nut 144 is then rotated counterclockwise for about ¼ inch of travel, whereupon handle 142 is similarly rotated until about ⅛th inch clearance is provided between the handle 142 and the adjacent face of preloader 132. This establishes a predetermined set point as to how the knives 68 can wear before requiring replacement. This is also a way to protect the knife unit 14, by preventing complete wear of the knives 68. The display 22 is then zeroed so that plate wear can be monitored in 0.001 inch increments.

If more knife force is needed, it is only necessary to loosen the locking nut 140 to unlock preloader 132, whereupon the preloader 132 is rotated clockwise until the desired cut of extrudate is achieved. The preloader 132 is then locked in place using nut 140. If less knife force is desired, the nut 140 is loosened, preloader 132 is rotated counterclockwise and the nut 140 is used to relock the preloader 132. In the event that a small clearance is desired between the knives 68 and plate 60, the cap nut 144 is loosened and handle 142 is rotated clockwise until its abuts preloader 132. The handle 142 is then further rotated clockwise until the desired clearance is achieved. If at any time there is a need to pull the knife unit 14 away from the plate 60, it is only necessary to grasp 142 and pull the mechanism 24, shaft 16, and knife unit 14 leftwardly as viewed in FIG. 6.

It will be appreciated that a key element of the simplicity and functionality of the knife assembly 10 resides in the use of the bearing 72 within bearing support 120. This construction handles all thrust loads and, in conjunction with cam screws 124 and cam slots 116 of housing 114, eliminates any rotational movement from that point back through the remainder of the assembly.

We claim:

1. A knife assembly including at least one knife engageable with an extrusion die, said knife assembly comprising:
   an elongated, axially rotatable knife shaft supporting said at least one knife;
   a motor operably coupled with said knife shaft for powered axial rotation thereof;
   a bushing supporting the knife shaft and permitting said axial rotation thereof and fore and aft axial movement of the knife shaft;
   a bearing secured to the end of said shaft remote from said knife, and a non-rotatable bearing support receiving said bearing; and
   adjustment mechanism operably coupled with said bearing support and operable to permit axial adjustment of said knife shaft to individual positions without interrupting the axial rotation of said knife shaft,
   said adjustment mechanism comprising—
      a biasing spring operably engaging the end of said bearing support;
      a preloader assembly operatively engaging the end of said spring remote from said bearing support in order to exert a loading force on said spring, thereby causing said spring to exert a force against said shaft end;
      a lock for securing said preloader assembly at selected positions thereof, whereby said preloader assembly may be moved in order to vary said force exerted by said spring against said shaft end to position said shaft at said individual positions thereof and to vary the force exerted by said knife against said die; and
      an elongated, threaded rod secured to said bearing support and extending through said preloader assembly, said lock threaded onto said threaded rod.

2. The knife assembly of claim 1, including axial shifting limit structure operably associated with said knife shaft for limiting the fore and aft axial movement of the knife shaft between fore and aft limits, said adjustment mechanism operable to axially adjust said knife shaft to individual positions within said fore and aft limits.

3. The knife assembly of claim 2, the distance between said fore and aft limits being at least about ½ inch.

4. The knife assembly of claim 3, said distance being from about 1-3 inches.

5. The knife assembly of claim 1, including axial shifting limit structure comprising a housing presenting a cam slot, and a cam follower within said slot and axially shiftable with said knife shaft, said housing receiving said bearing support.

6. The knife assembly of claim 5, said housing being hollow with said bearing support slidably mounted therein, said cam follower secured to said bearing support.

7. The knife assembly of claim 1, including a sensor assembly operable to determine the fore and aft position of said knife blade.

8. The knife assembly of claim 7, including a display connected with said sensor assembly in order to display the fore and aft position of said knife shaft.

9. The knife assembly of claim 1, including a mounting and support assembly for said knife assembly and having a section adapted for coupling to the outlet end of an extruder.

10. The knife assembly of claim 1, including a handle operable to engage said preloader assembly to permit axial shifting movement of the knife shaft.

11. The knife assembly of claim 1, said preloader assembly comprising an elongated, tubular body telescoped over said threaded rod, and a spring washer carried by said tubular body and engaging the end of said biasing spring.

* * * * *